(12) United States Patent
Chapman

(10) Patent No.: US 6,322,615 B1
(45) Date of Patent: *Nov. 27, 2001

(54) HIGH EFFICIENCY PERMANENT AIR FILTER AND METHOD OF MANUFACTURE

(76) Inventor: Rick L. Chapman, 427 Lupine Way, Ventura, CA (US) 93003

( * ) Notice: Subject to any disclaimer, the term of this patent is extended or adjusted under 35 U.S.C. 154(b) by 0 days.

This patent is subject to a terminal disclaimer.

(21) Appl. No.: 09/466,245

(22) Filed: Dec. 17, 1999

Related U.S. Application Data (6362) Continuation-in-part of application No. 09/155,059, filed as application No. PCT/US97/18482 on Oct. 15, 1997, now Pat. No. 6,056,809.
(60) Provisional application No. 60/028,786, filed on Oct. 18, 1996.

(51) Int. Cl.[7] .................................................. B01D 27/06
(52) U.S. Cl. .................................. 96/67; 55/486; 55/521; 55/DIG. 5; 95/57; 96/69; 264/258; 264/DIG. 48
(58) Field of Search .................................. 96/15, 17, 55, 96/57–59, 66–69, 98–100; 95/57, 63, 69, 70, 78; 55/486–488, 497, 521, 527, 528, DIG. 5, DIG. 33, DIG. 35, DIG. 39; 264/257, 258, DIG. 8, DIG. 48

(56) References Cited

U.S. PATENT DOCUMENTS

| | | | |
|---|---|---|---|
| 4,375,818 | * | 3/1983 | Wadsworth et al. .............. 55/DIG. 5 |
| 4,886,526 | * | 12/1989 | Joannou .................................... 96/67 |
| 4,978,372 | * | 12/1990 | Pick ........................................ 96/67 |
| 5,240,479 | * | 8/1993 | Bachinski .......................... 55/528 X |
| 5,403,383 | * | 4/1995 | Jaisinghani ........................... 96/99 X |
| 5,419,953 | * | 5/1995 | Chapman ............................. 95/57 X |
| 5,496,507 | * | 3/1996 | Angadjivand et al. ............ 55/528 X |
| 5,540,761 | * | 7/1996 | Yamamoto ................................ 96/67 |
| 5,645,057 | * | 7/1997 | Watt et al. .................... 264/DIG. 48 |
| 5,651,811 | * | 7/1997 | Frey et al. ................................ 96/69 |
| 5,667,562 | * | 9/1997 | Midkiff .................................... 96/15 |
| 5,690,719 | * | 11/1997 | Hodge ........................... 55/DIG. 35 |
| 5,792,242 | * | 8/1998 | Haskett ......................... 55/DIG. 39 |
| 5,922,096 | * | 7/1999 | Stemmer .......................... 55/521 X |
| 5,989,303 | * | 11/1999 | Hodge .................................... 55/486 |
| 6,056,809 | * | 5/2000 | Chapman ................................. 96/67 |

* cited by examiner

Primary Examiner—Richard L. Chiesa
(74) Attorney, Agent, or Firm—Marvin E. Jacobs

(57) ABSTRACT

A novel air filter design for use in residential and commercial heating and air conditioning systems comprising a laminated unit having a filter media where the upstream side of the filter media having a porous layer of passive electrostatic netting. The air filter design has a corrugation configuration to increase the available surface area when compared to conventional flat filters.

20 Claims, 6 Drawing Sheets

HIGH EFFICIENCY PERMANENT AIR FILTER AND METHOD OF MANUFACTURE

CROSS-REFERENCE TO RELATED APPLICATIONS

This application is a continuation-in-part of U.S. application Ser. No. 09/155,059 filed Sep. 18, 1998, now U.S. Pat. No. 6,056,809 which is a national stage of PCT Application No. PCT/US97/18482 filed Oct. 15, 1997, which is in turn is based on Provisional Application Serial No. 60/028,786 filed Oct. 18, 1996.

TECHNICAL BACKGROUND

The present invention relates to filters cleanable by washing or vacuuming or the like for inlet air heating and air conditioning systems used in residential or commercial buildings and, more particularly, this invention relates to an electrostatic filter for such systems having an extended service life.

BACKGROUND ART

Inlet air filters for heating and air conditioning systems have been in use for decades. The inlet air or primary filter was originally intended to protect the heating coils and mechanical devices such as fans from damage by airborne particles. As the harmful effect of inhaled particles on human health became known, inlet air filters were designed remove this particulate matter from the air.

The most popular prior art configuration is a thin, rectangular, disposable filter. The filter contains fiberglass, animal hair, fibrous foam or polymeric media or aluminum mesh encased in a cardboard or plastic frame. Prior art filters can comprised polyester panels, urethane foam or latex coated animal hair. Recently, prior art filters containing static or passive electrostatic media have become available.

Most residential resistance specifications require air filters to have an initial pressure drop of no more than 0.22 inches of water for an air flow rate of 300 feet per minute. The dust spot efficiency for typical prior art air filters tested using ASHRAE 52.1-1992 is 20% or less. The ASHRAE efficiencies of four types of commercially available filters follows:

TABLE 1

| Filter Type | Area of Media Square Feet | ASHRAE EFFICIENCY |
| --- | --- | --- |
| Fiberglass Throwaway | 4.0< | 20% |
| Electrostatic (Passive) | 4.0 | 20% |
| Electrostatic (Fibers) | Up to 8.9 | 30% |
| Pleated Polyester Blend | Up to 6.9 | 25% |

When these filters are first placed in use across an air stream, they have a very low filtering efficiency. Typically, the exhaust or dust spot efficiency is about 8%. However, as dust particles are collected, the dust collection efficiency can increase to approximately 20%. At this point, the filter is ready to be replaced. Prior art filters are usually difficult to clean since the dust particles become embedded in the media.

Another current concern is the recognition that particles below 10 microns are not filtered by the cilia hairs in the nose and are therefore inhaled into a human lung. Fibrous particles such as asbestos and fiberglass are known to cause respiratory diseases. Most current inlet air filters for heating and air conditioning systems are not very efficient in capturing these small particles. Filters containing layers of electrostatic media perform better within this range of particles but these filters also become clogged. Since they cannot be efficiently cleaned they must be replaced.

The Ashrae 52.0 standard test is concerned with a resistance and dust sport efficiency. This test is concerned with quantity not the quality of the dust captured. This testing method was satisfactory when the emphasis was on protecting the system components. Ashrae standard testing method 52.2 entitled "Method of Testing General Ventilation Air Cleaning Devices for Removal by Particle Size" was developed to certify the ability of ventilation filters to remove particles below 10 microns from inlet air. The filtration efficiency of ventilation air filters used in residential and commercial buildup is measured in MERV's (Minimum Efficiency Rating Value). The U.S. Environmental Protection Agency (EPA) operates six laboratories throughout the U.S. that evaluates and certifies performance of ventilation filters according to Ashrae 52.2 and other testing methods.

The ventilation filters disclosed in pending application Ser. No. 09/155,059 modified the angle of approach of the air stream to effect the particle capture efficiency. This increased the life of the filter between cleaning and eased the difficulty of cleaning. The filter had a non-perpendicular path of air flow resulting from the corrugated or pleated configuration of the novel air filter. Because of the corrugated configuration, the filter contained more surface area than a standard, flat, prior art air filter. The increased surface area of the novel filter also results in a lower pressure drop than experienced with prior art electrostatic air filters. The filter has significantly longer life between cleanings and it is very easy to clean. The efficiency for removing particulate matter is significantly improved over prior ventilation filters.

The improved filter includes an upstream passive electrostatic layer disposed adjacent a core or central filter media layer forming an assembly. The assembly is corrugated or pleated to increase filter surface area as compared to a flat surfaced air filter.

The core or central layer is a bendable mechanical filter media material, from 0.01 to 0.45 inches in thickness selected from polymeric foam or a fibrous polymeric material such as air laid polyester fibers having a density of from 0.5 to 5 ounces per square yard (OPSY). The fibers are resin bonded by a resin such as an acrylic resin or point bonded or needle bonded with electrostically charged fibers. In a preferred embodiment the central or core layer is comprised of a thermoset material. This material removes most of the particles from the air stream, typically up to 50 to 85% of the incoming particles at 3 to 10 microns.

From a morphological standpoint, pollens differ in size, form, moisture content, weight and their content of specific antigens. The size of the pollen grains range from 2–3 microns up to 250 microns and in the majority of allergenic plants is between 20 and 45 microns.

The particle capture efficiency of the core material is enhanced by placing a layer of electrostatic polymer material on each side of the core material. The material can be woven or non woven. More preferably, passive electrostatic materials are used which become charged as air flows past the polymers that tend to have natural static charges. These are preferred since the available active electrostatic fibrous materials produce an undesirably high pressure drop as a filtration media and are not cleanable. The passive material is usually formed by casting, extrusion or weaving from a polymer of a monosaturated alkene monomer having 2–8 carbon atoms. One type of material is woven polypropylene netting having a thickness from 0.01 to 0.20 inches, usually from 0.08 to 0.18 inches. The netting can be woven in a manner to resemble a honeycomb structure.

The outside grill layer does not contribute to filtering but is present to hold the angled media after it has been formed. Again, the layer must be capable of being easily bent or deformed during the assembly process. If the sheet of material is too thick it is difficult to bend and if it is too thin, it is not capable of holding the multi-layer media in its bent shape. The grill can be formed of a high strength, rigid polymer or of metal. Expanded metal such as steel or aluminum having a thickness from 0.010 to 0.25 inches, performs satisfactorily.

Corrugated filters that were first prepared had a MERV efficiency of about 6. Though this was a substantial improvement over the commercially available electrostatic filters, the increasing awareness of the harmful effects of inhaled particles in the less than 10 micron range demanded that ventilation filters have MERV efficiencies over 6.

STATEMENT OF THE INVENTION

It has been discovered in accordance with this invention that the efficiency of corrugated, electrostatic ventilation filters for small particles can be increased by increasing the mechanical particle capturing capability of the central media. This in combination with increased surface area provided by higher density of corrugations and smaller angles between corrugations provides the desired particle capture efficiency. The porosity of the passive electrostatic netting can be increased to reduce the overall initial resistance of the corrugated media to air flow. Another aspect of the invention relates to the ability to achieve the higher density and lower angle corrugations. In the method of the invention, after leaving the corrugator, the assembly of layers is compressed in a buncher to decrease or increase the width of the corrugations.

The novel air filter may be made into any size. Because of the resilient tendency of the central layer material as described earlier, the larger the air filter, heavier gauge material may be required to maintain the filter's corrugated shape especially in the central surface area of the filter.

Another feature of the invention is the use of two sheets of expanded metal. The prior art used expanded metal or plastic grills only for cleanable, washable electrostatic filters. In the invention the expanded metal layers are bent into an angled form at the same time as the electrostatic media and central layer. The metal layers prevent the angled electrostatic media and central layer from returning to a flat form. The metal layers have very wide openings and thin strands which do not contribute to capturing particles but also do not contribute to pressure drop of the composite media.

The filter of the invention is optimally angled to capture particles. It can be cleaned by vacuuming and/or by washing. The media has low pressure drop and high efficiency for the range of particles experienced with the inlet air. Because it can be cleaned and reused, it can be considered a permanent filter.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 3b is an enlarged view in section of the corrugation of the media shown in FIG. 3a;

FIG. 4b is an enlarged view in section of the corrugation in the media shown in FIG. 4a;

FIG. 5b is an enlarged view in section of a pleat in the media shown in FIG. 5a;

FIG. 6b is an enlarged view in section of a pleat in the media shown in FIG. 6a.

DETAILED DESCRIPTION OF THE INVENTION

The filter media is comprised of fibers of a plastic material such as polyester or nylon held together mechanically by adhesive, thermal bonding or with binder resin, preferably a standard or curable binder resin. The filter media is selected from material which can capture in excess of 80% of particulate matter of 10 micron or less in size. The filter media layer is preferably made from polyester fibers, a curable resin binder preferably containing an antimicrobial agent. The resin can be a curable thermosetting, light cured or water activated resin. The resin may be dispersed throughout the media, applied as stripes to the media at locations corresponding to the tops of the pleats, before or after pleating, preferably after pleating. The resin is then cured to a rigid state to hold the pleats in shape. The rigid filter media, in combination with a passive electrostatic layer can be corrugated without the need of metallic grills to maintain the corrugated shape. The passive electrostatic layer can be a netting material. The electrostatic layer may be made from media such as polypropylene, polyester, nylon or polycarbonate. More preferably, the electrostatic layer is made from DELNET RB0404-12P, a product of Applied Extrusion Technology, Middletown, Del. or equivalent. In use, the air filter would be installed with the electrostatic layer facing upstream. In this embodiment, stitching, stapling, thermal welding, adhesives or other means could be utilized to attach the filter media and electrostatic layer to one another. Additionally, a second electrostatic layer may be disposed on the downstream side of the filter media to increase the filter's efficiency.

A grill, suitably formed of plastic or expanded metal is disposed on the outward facing surface of at least one of the electrostatic layers. The grill is preferably made from metal. Most preferable, the grill is made from a non-corrosive metal such as galvanized steel. A non-metallic material may also be utilized as a grill. The purpose of the grill is to provide a deformable material which will cause the filter, once corrugated, to maintain its corrugated shape. At least one grill layer is required when a resilient filter media is used which will tend to return to a flat shape.

The grill may be easily washed. Either side of the grill may face downstream provided the grill layer is the outside layer. It has been discovered that if the grill is positioned between the electrostatic and central layers, adhesive may be used to bond the grill to both layers. This has the advantage of overcoming the resilient tendency of the central layer to become flat. The grill however, may be disposed between the central layer and the netting layer. Testing has shown that while the air flow tends to force the electrostatic layer into the grill and central layer on the upstream side, on the downstream side air flow tends to displace the electrostatic layer away from the central layer. Therefore, it is preferred to position the grill layer as the outside layer on the downstream side.

The most preferable gage thickness is dependent upon the size of the air filter. Larger air filters will require a more sturdy or heavier gage grill. The expanded metal grill should have open area of at least 70%. Open area can be provided by thin strands from 0.01 to 0.18 in thickness expanded to rectangular or parallelogram openings having an area of at least 0.5 square inches.

In order to increase the small particle capture efficiency (MERV 7-15) it was found necessary to decrease the thickness of the central media and of the fibers used in the media as follows:

| | Ser. No. 155,059 | |
|---|---|---|
| | Prior Media | New Media |
| Thickness | | 0.025 to 0.035" |
| Density | 4 OSPY | 1–4 OSPY |
| Pleats Per Foot | 12 | 14–25 |
| Area | 160% | 185–260% |
| Fibers | 10–35%, 5–10 denier 50–90%, 10–40 denier | 10–35%, 0.5–5 denier 50–90%, 2–15 denier |

As the density and thickness of the central filter media is increased, efficiency increased for the same surface area. The efficiency is increased and the resistance decreased by spacing the corrugations closer together such that the angle between the walls of a corrugation are from 0–20% to increase the surface area by at least 90% to about 100%. The pleats per foot increases from about 12 up to about 25.

The resistance to air flow can further be decreased by increasing the porosity of the passive electrostatic netting by at least 10% such as from 1200 cfm frazier to 1300–2000 cfm frazier.

Figure 1:
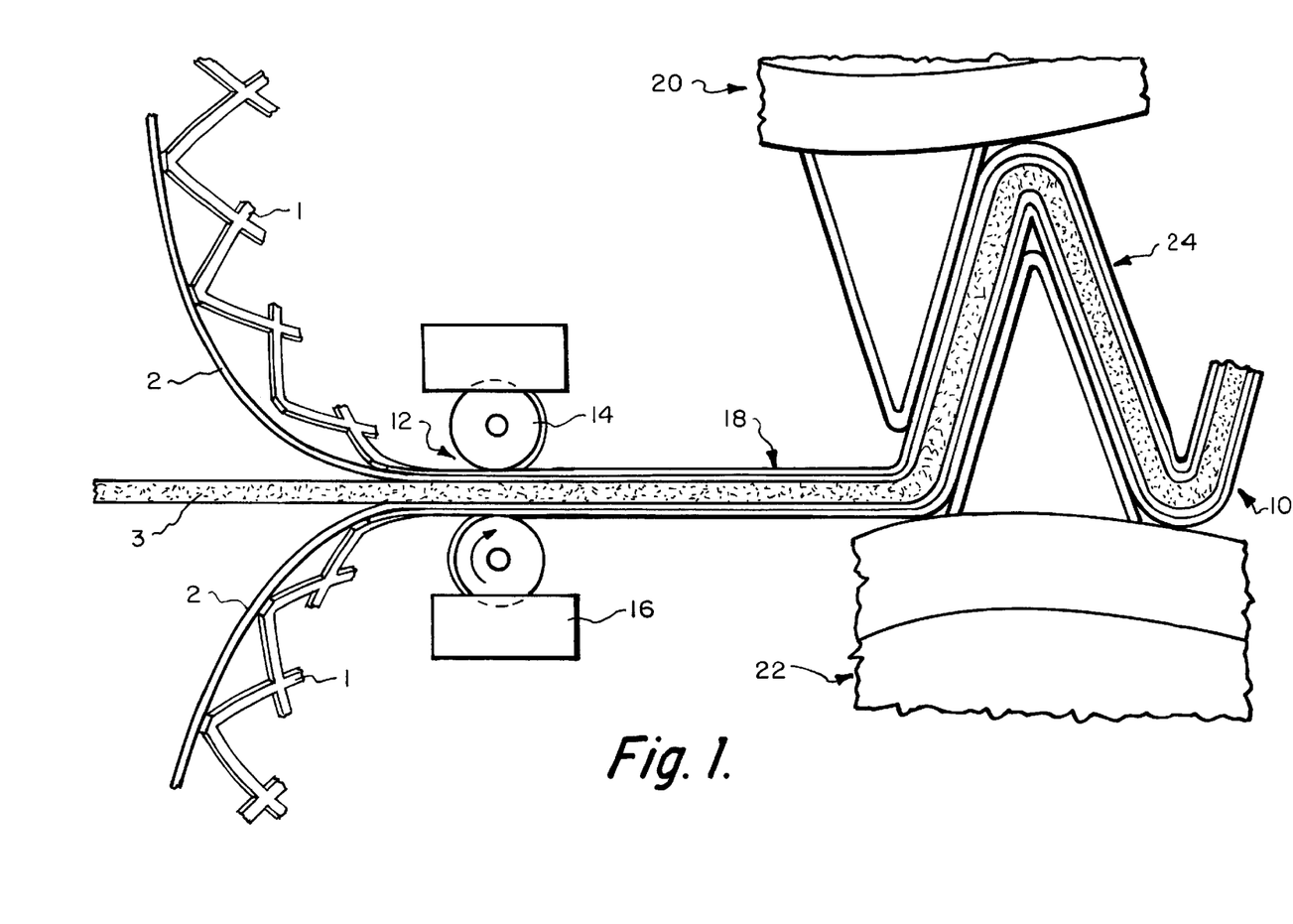
FIG. 1 is a schematic view of a corrugation apparatus for forming a 5 layer corrugated ventilation filter in accordance with the invention.

Referring now to FIG. 1, a five layer filter 10 is formed by feeding two outside sheets 1 of expanded steel grill, two adjacent sheets 2 of passive electrostatic media and a central layer 3 of mechanical filtration media into the nip 12 of a set of rollers 14, 16 to form a five layer assembly 18. The assembly is fed between a set corrugation rollers 20 and 22 to form a corrugated media 24 which is then processed in a buncher, not shown, to provide the desired angle and number of pleats per foot.

Figure 2:
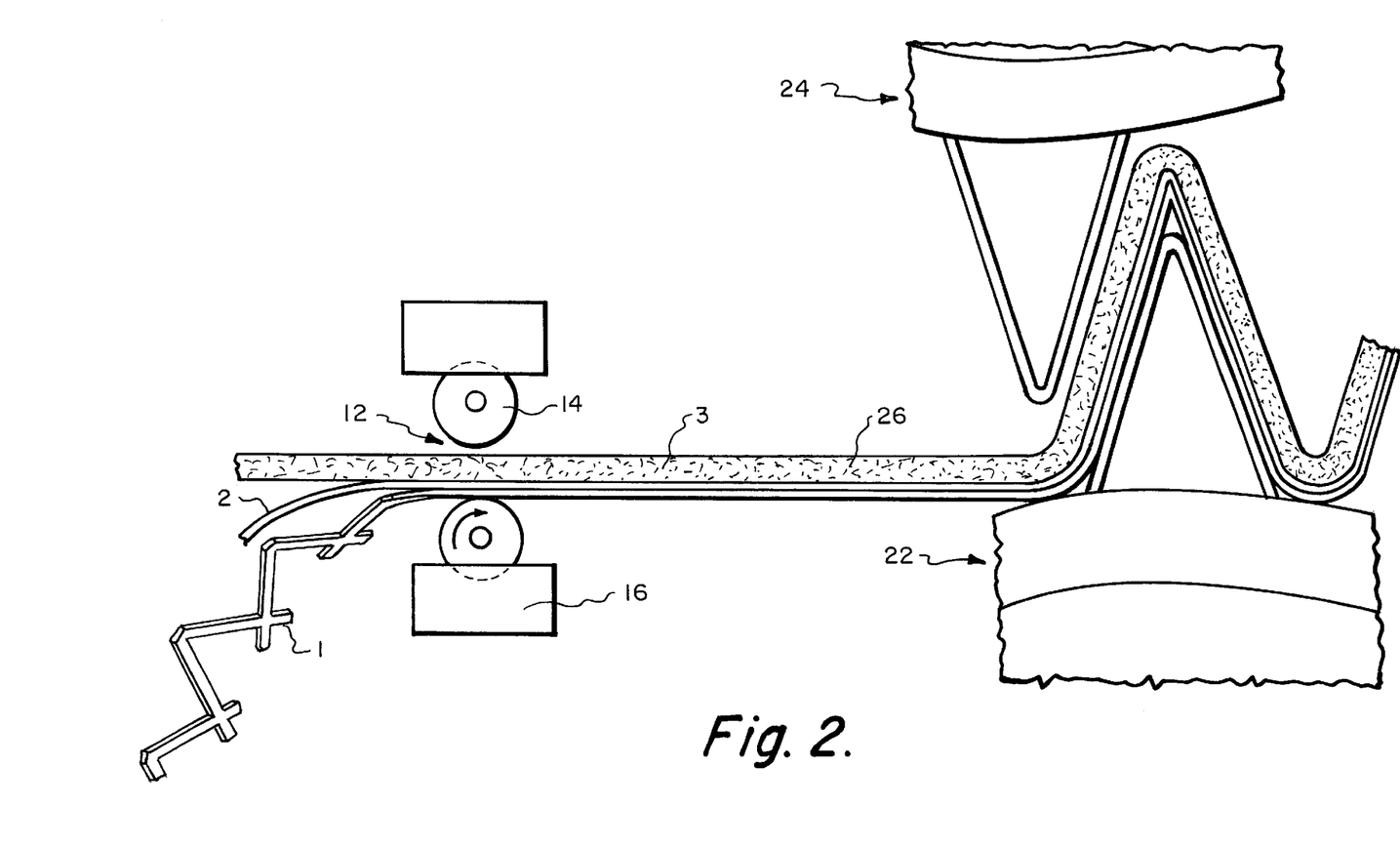
FIG. 2 is a schematic view of an apparatus for forming a 3 layer corrugated filter.

The same apparatus is shown in FIG. 2 to form a three layer filter assembly 26.

Figure 3A:
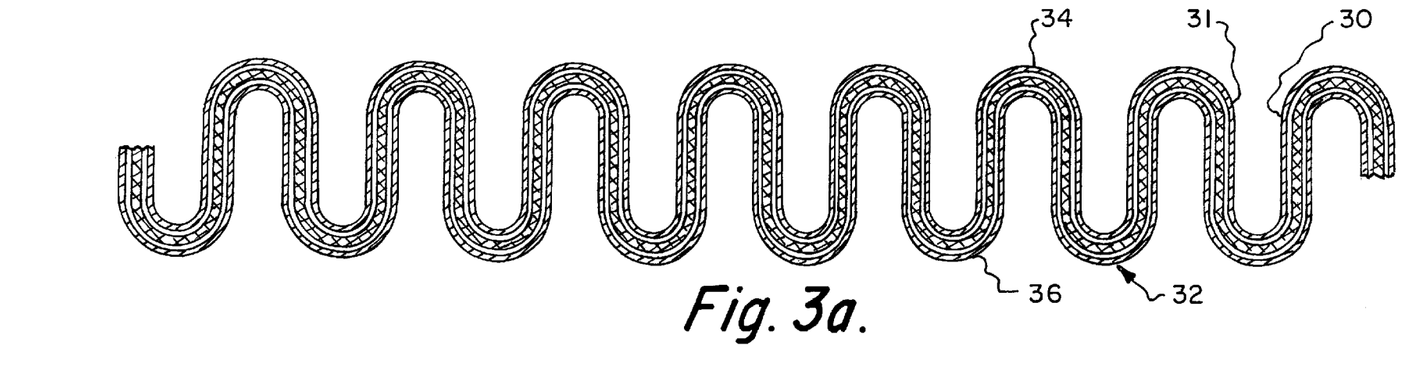
FIG. 3a is a side view in elevation of a 5 layer corrugated media with an angle between the walls of pleats.
Figure 3B:
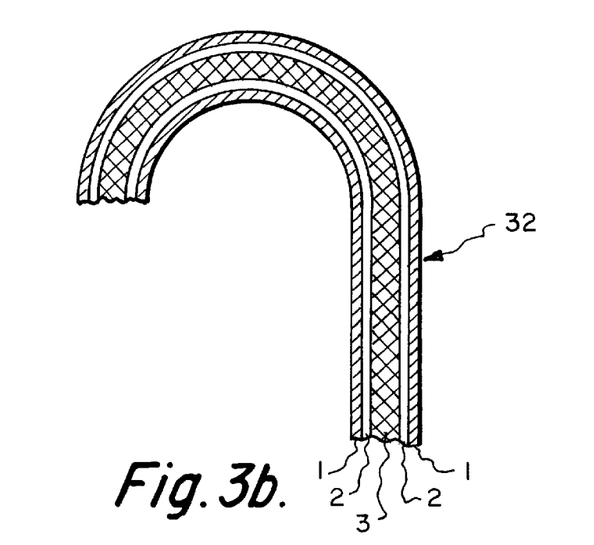

FIGS. 3a and 3b illustrate a five layer media 33 in which the adjacent walls 31, 30 of the media are parallel (zero angle) due to formation of pleats 32 having rounded top ends 34 and bottom ends 36.

Figure 4A:
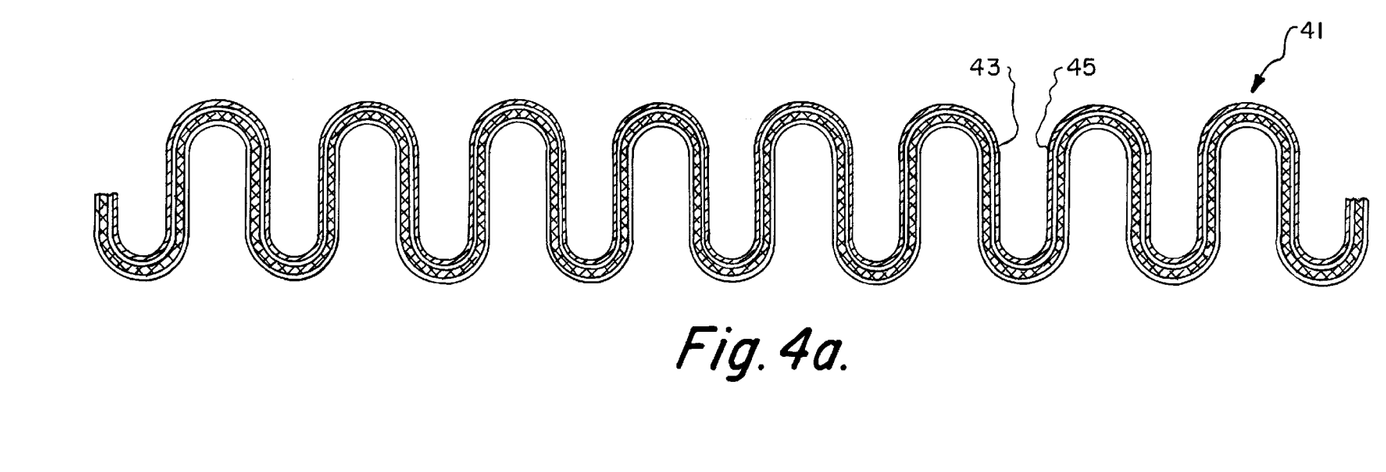
FIG. 4a is a size view in elevation of a 4 layer corrugated media.
Figure 4B:
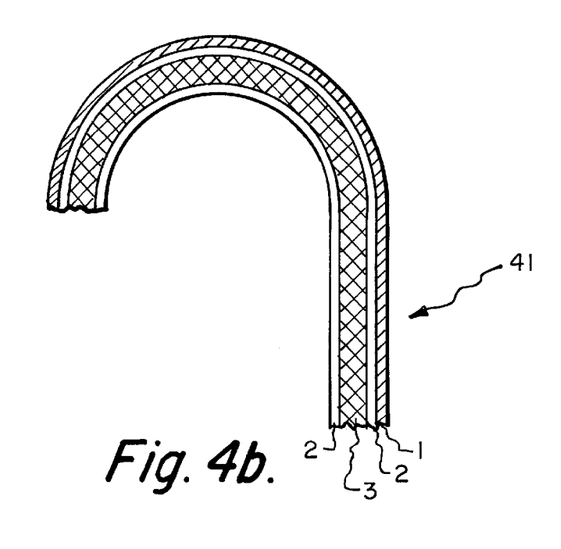

FIGS. 4a and 4b illustrate a four layered corrugated filter 41 having zero angle between adjacent walls 43, 45.

Figure 5A:
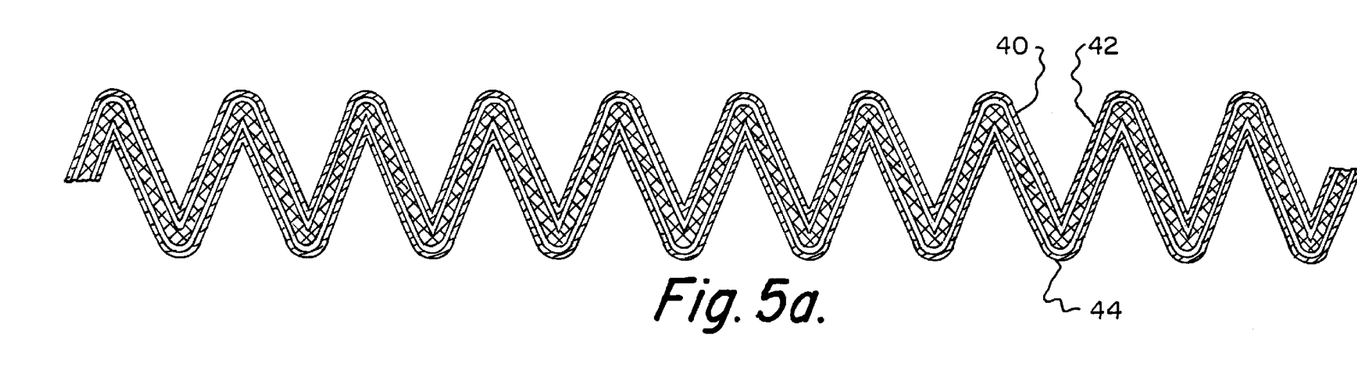
FIG. 5a is a side view in elevation of a 5 layer pleated media.
Figure 5B:
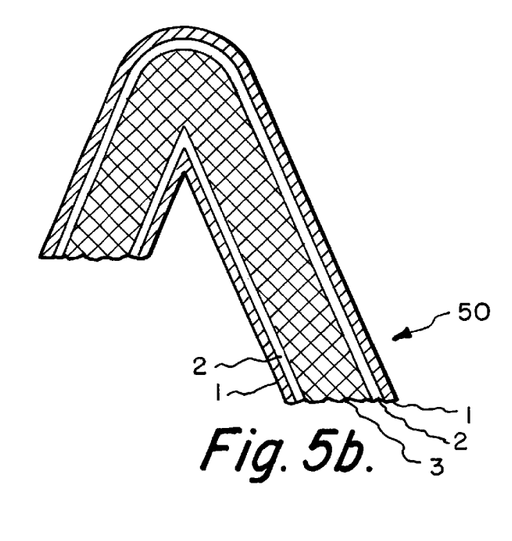

FIGS. 5a and 5b illustrate a five layered corrugated filter 50 having 20 degrees between the adjacent walls 40, 42 of the corrugations 44.

Figure 6A:
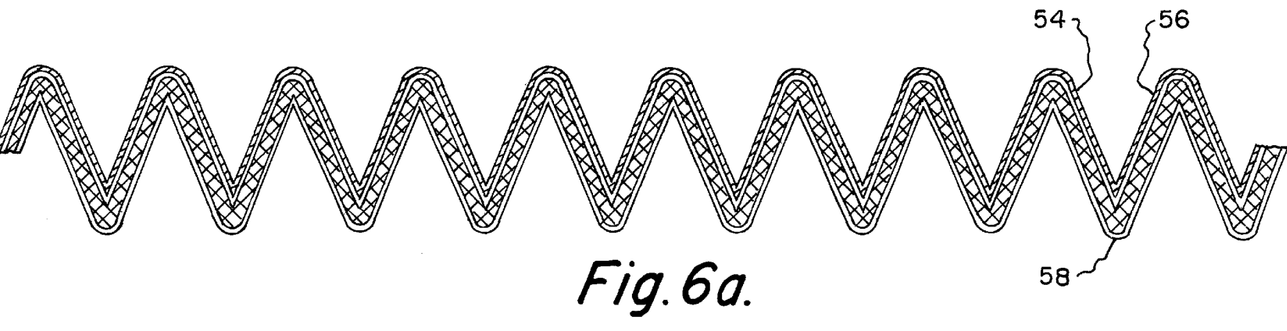
FIG. 6a is a side vie win elevation of a 4 layer pleated media.
Figure 6B:
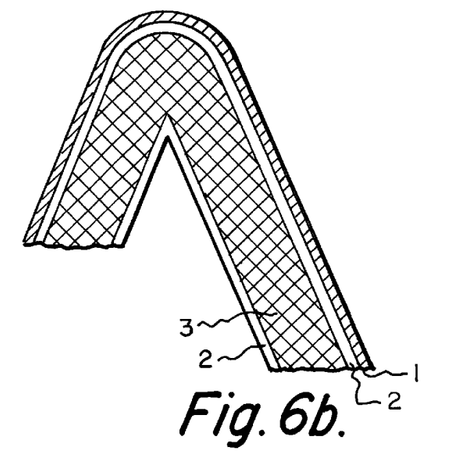

FIGS. 6a and 6b illustrate a four layered corrugated filter 52 having 20 degrees between adjacent walls 54, 56 of the corrugations 58.

EXAMPLE 1

A five layer corrugated filter was prepared according to Ser. No. 155,059. The filter contained 2 outer layers of expanded galvanized steel having a thickness of 0.015 inches and strand thickness of about 0.04 inches. The rectangular openings were 1.5×0.75 inches.

The passive electrostatic layers adjacent each exterior layer is comprised of polypropylene netting having a thickness of 8 mills, a weight of 0.8 oz/yard$^2$ and a yarn count of 22 warp yarns per inch and 12 fill yarns per inch.

The center layer disposed between the electrostatic layers is a soft, air laid polyester having the following properties:

| | |
|---|---|
| Weight (ounces per square yard): | 4.0 +/− 10% |
| Gauge (inches): | 0.25 +/− 5% |
| Fiber Content: | Polyester |
| | (25%–6 & 75%–15 Denier) |
| Binder Type: | Acrylic Latex |
| | (solids 38%) |
| Porosity (cfm/Ftsq. @ 0.5 WG): | 740 cfm |
| Color: | White |
| Texture: | Stiff/Lofty |
| Antimicrobial: | Aegis |
| | or Equivalent |

The five layer assembly was corrugated and bunched to form a filter having 12 corrugations per foot and an angle of 30 degrees between walls of the pleats. The filter was tested according to Ashrae 52.2 and was rated at approximately MERV 6.

EXAMPLE 2

The central filter media of the filter of Example 1 was replaced with an acrylic bound polyester media formed of 20% of 2.25 denier and 75% of 15 denier polyester fiber blend having a density of 4 ounces per square yard. The corrugations were 12 corrugation per foot. The electrostatic polypropylene netting had a porosity of 1400 cfm and an initial resistance to air flow of 0.14 inches 2.g. The filter was rated at MERV 7.

EXAMPLE 3

The central media of the filter of Example 2 was replaced with a media containing a mixture of 25% 0.9 denier polyester fibers and 75% 3 denier polyester fibers having an overall weight of 2.3 ounces per square yard. The assembly was corrugated to contain 20 corrugations per foot. The initial resistance to air flow was 0.18 inches w.g. and a MERV 8 rating was achieved.

The radial pleat or corrugated air filter has an increased surface area over the prior air flat filter. Its ease of cleaning can be attributed to the filters ability to let the dust collect between the folds and not enter the filter media itself. The filter will have a larger dust holding capacity and will last longer between cleaning. As the filter collects dust, the filter efficiency will increase.

The filter assembly of the invention is suitable for replacement of filters used for filtering incoming air supplied to residential heating and air conditioning systems. The filters usually have a thickness from 0.5 inch to 3 inches, typically 1 to 2 inches and are rectangular usually having a width of 1 to 3 feet and a length of 1 to 3 feet.

The filter of the invention shows substantially better capture efficiency at all particle sizes. The filter of the invention will capture a greater number of particles that affect respiratory or allergic reactions.

It is to be realized that only preferred embodiments of the invention have been described and that numerous substitutions, modifications and alterations are permissible without departing from the spirit and scope of the invention as defined in the following claims.

What is claimed is:

1. A washable, air filter for filtering inlet air to a heating and/or air conditioning system comprising an assembly formed of:

a formable, non-electrostatic pad of a low to high-loft, bonded polymeric fibers having a high filtering efficiency for 10 micron and less particles and having a thickness from 0.01 to 0.45 inches and a density from 0.05 to 5 ounces per yard, said pad having an upstream front surface and a downstream rear surface;

a layer of porous, passive electrostatic polymeric material disposed on at least one side of the pad having a downstream surface in contact with said surfaces, and having an outside surface;

a deformable grill disposed in contact with the surface of the polymeric material; and said assembly having a pleated or corrugated configuration in which the angle between adjacent wall surfaces of the pleats is from 0° to 20°.

2. An air filter according to claim 1 in which the passive electrostatic material is a woven fabric selected from the group consisting of a polyalkylene of 1–8 carbon atoms.

3. An air filter according to claim 2 in which the passive electrostatic fabric is a woven or non-woven net.

4. An air filter according to claim 2 in which the passive electrostatic fabric is a woven fabric comprising polypropylene or polyethylene.

5. An air filter according to claim 3 in which the net fabric has a thickness of from 0.01 inch to 0.1 inch.

6. An air filter according to claim 2 in which the polymeric fibers are polyester.

7. An air filter according to claim 6 in which fibers are bonded by an acrylic resin.

8. An air filter according to claim 7 in which the filter has a periphery and further including a stiff frame engaging said periphery.

9. A filter according to claim 3 in which the thickness of the fabric material is from 0.01 to 0.45 inches.

10. A filter according to claim 9 in which the non-woven net has a flat structure.

11. A filter according to claim 1 in which the filter has an efficiency for 0.3 micron particles of at least 4.0% at 0.20 inches with resistance at 300 fpm.

12. A filter according to claim 1 in which the fibers have a thickness below 20 denier.

13. A method of filtering inlet air to an air conditioning and heating system with a permanent filter comprising steps of:

placing a washable filter as defined in claim 1 in the path of the inlet air;

capturing particles from the inlet air onto the filter pad;

removing the filter from the path of the inlet air;

washing the filter pad to remove the particles; and repositioning the filter in the path of the inlet air stream.

14. A method of manufacturing a washable filter for filtering inlet air flow to a heating and/or air conditioning system, comprising the steps of:

placing a sheet of passive electrostatic polyalkylene netting in contact with the surfaces of a formable pad of a high-loft, air laid, bonded, polymeric fibers having a thickness from 0.01 to 0.45 inch and a density from 0.1 to 5 ounces per yard and a high efficiency for 10 micron or less particles;

placing a porous layer in contact with the outer surfaces of the netting to form an assembly; and corrugating said assembly to form pleats in which the angle between wall surfaces is from 0° to 20°.

15. A method according to claim 14 in which the passive electrostatic netting is a woven or non-woven fabric selected from the group consisting of a polyalkylene of 1–8 carbon atoms.

16. A method according to claim 15 in which the passive electrostatic woven fabric consists of polypropylene or polyethylene.

17. A method according to claim 16 in which the woven fabric has a thickness of from 0.01 inch to 0.20 inch.

18. A method according to claim 17 in which the polymeric fibers are polyester.

19. A method according to claim 18 in which the fibers are bonded by an acrylic-based resin.

20. A method according to claim 14 in which said filter has a periphery and further including the step of encasing said periphery in a metal frame.

\* \* \* \* \*